May 10, 1955  J. P. BUTTERFIELD  2,707,799
TORSION BAR HINGE ASSEMBLY
Filed May 13, 1950  2 Sheets-Sheet 1
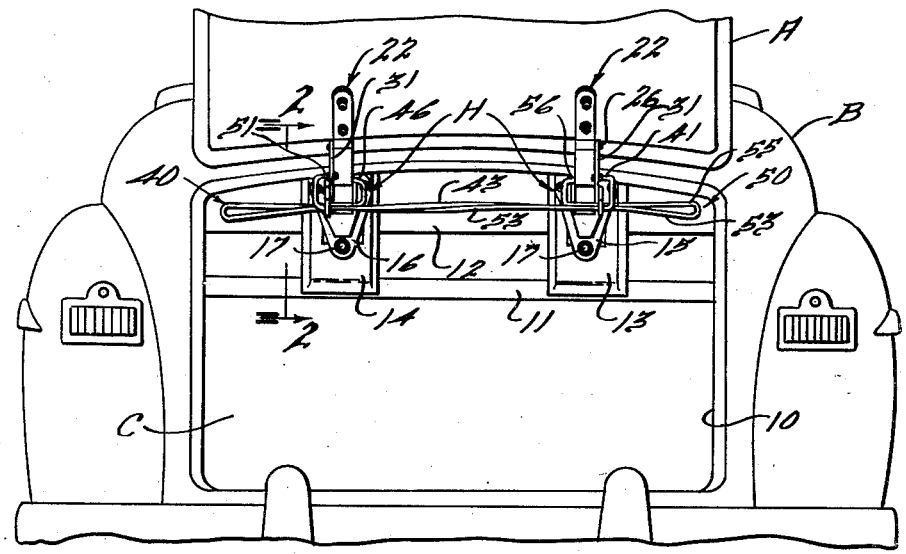
INVENTOR.
John P. Butterfield
BY
Harness and Harris
ATTORNEYS.

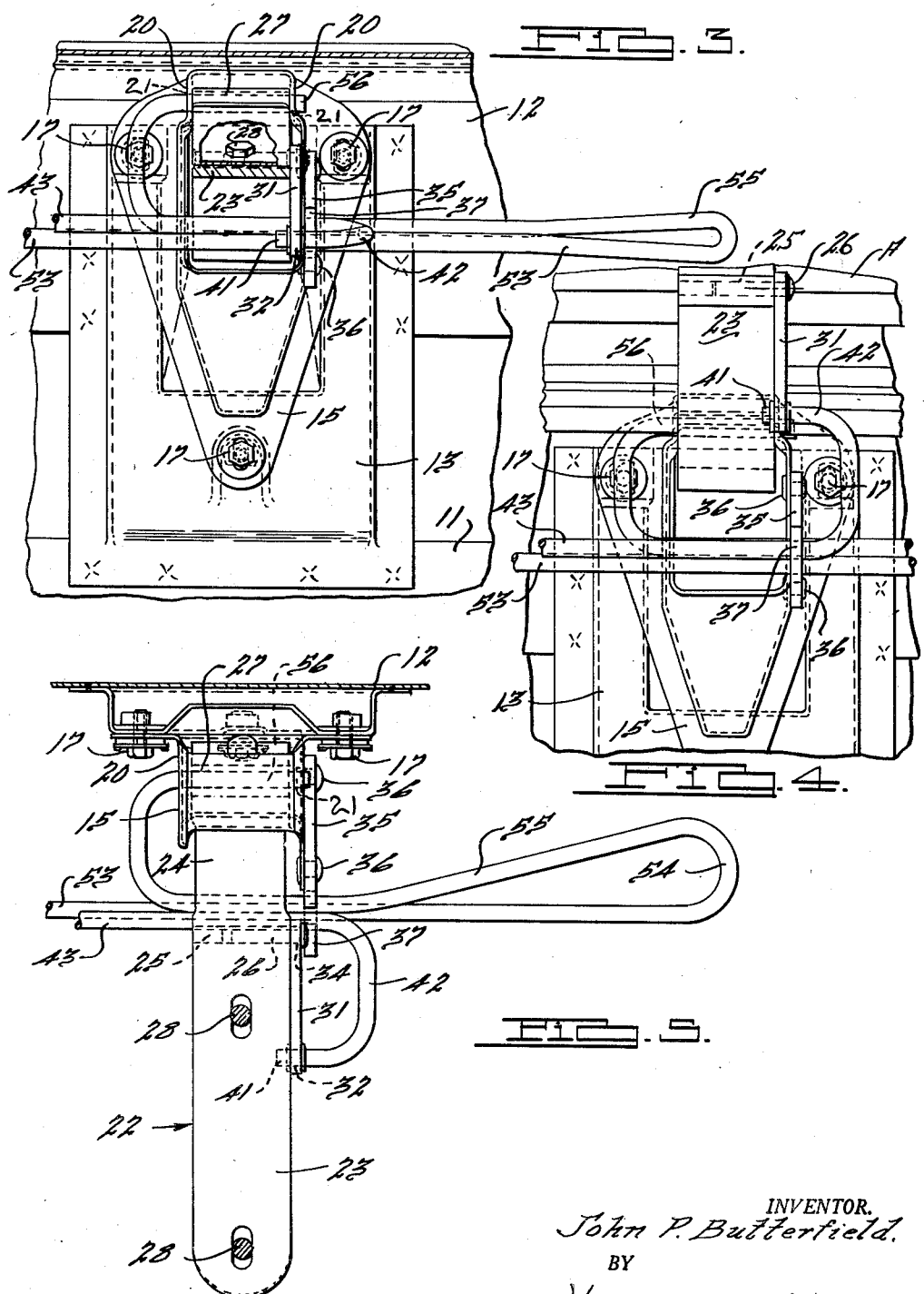

United States Patent Office 2,707,799
Patented May 10, 1955

2,707,799
TORSION BAR HINGE ASSEMBLY

John P. Butterfield, Grosse Pointe, Mich., assignor to Chrysler Corporation, Highland Park, Mich., a corporation of Delaware Application May 13, 1950, Serial No. 161,845

9 Claims. (Cl. 16—180)

This invention relates to hinge constructions and refers more particularly to improvements in hinges of the type commonly employed for supporting trunk lids or rear deck closures on motor vehicle bodies.

Considerable difficulty has heretofore been encountered in developing a satisfactory hinge for use in mounting trunk lids or rear deck closures on motor vehicle bodies and one of the most serious problems involved has been to provide a hinge of such a compact construction that it will not appreciably obstruct the storage space provided within the compartment.

It is one of the principal objects of this invention to overcome the foregoing difficulties by providing a compact hinge construction which occupies the minimum space within the storage compartment and at the same time embodies means for effectively holding the pivotally mounted closure member for the compartment in both open and closed positions.

Another advantageous feature of this invention resides in the provision of a compact hinge construction of the character set forth wherein the means for holding the compartment closure member in either its opened or closed positions also assists in the movement of the closure member to either of said positions.

It is a further object of this invention to provide a closure member hinge construction incorporating a torsion bar spring element for counterbalancing the closure member, the torsion bar spring element serving a dual purpose of also providing the hinge pintle means for the strap and bracket type hinge elements.

In addition to the foregoing, the present invention contemplates a compact hinge construction embodying the foregoing features and composed of a relatively few simple parts each of which is capable of being economically manufactured, assembled and installed in a closure member construction of the type described.

The foregoing, as well as other objects and advantages of this invention, will be more readily apparent as the following description thereof proceeds, especially when considered in connection with the accompanying drawings wherein:

Fig. 1 is an elevational view of the rear end of a motor vehicle body having a storage compartment with a closure member employing this invention to hingedly connect the closure member to the body;

Fig. 2 is an enlarged, fragmentary, sectional elevational view taken along the line 2—2 of Fig. 1 disclosing the hinge structure in both raised and lowered positions;

Fig. 3 is an enlarged fragmentary elevational view of the hinge structure shown in Fig. 2, the view being taken along the line 3—3 of Fig. 2 showing the closure member and hinge structure in closed position;

Fig. 4 is an enlarged elevational view similar to Fig. 3 but showing the closure member and hinge structure in opened position;

Fig. 5 is an enlarged, fragmentary, elevational view taken along the line 5—5 of Fig. 2; and Fig. 6 is a plan view of the pair of torsion bar spring elements associated with the hinge structures that pivotally connect the closure member to the vehicle body.

In the embodiment of the invention disclosed in the drawings the torsion bar spring hinge elements 40, 50 are shown applied to the pair of hinge structures H associated with the rear deck closure member or trunk lid A of the automobile body B. Lid A is hingedly connected to the body B by the hinge structure H so that the lid A forms a pivotally mounted closure member for the opening 10 to the body compartment C. Located in the upper forward portion of the compartment C are a pair of relatively fixed body frame members 11, 12 that may extend horizontally between the opposite sides of the body compartment C. Mounted on the support members 11, 12 so as to extend therebetween in spaced relationship are a pair of support plates 13, 14. The support plates 13, 14 are adapted to provide supports for the relatively fixed, bracket type hinge pintle supports 15, 16 of the hinge assemblies H. Brackets 15, 16 are removably connected to the support plates 13, 14 by the bolts 17. Support plates 13 and 14 and the hinge structures H associated with each support plate are identical therefore a description of only one hinge structure H will be given.

The spaced side walls 20 of the dome-like bracket 16 provide a yoke-like formation of U-shaped cross section adapted to receive the associated strap hinge 22. Walls 20 of the yoke-like bracket 16 are formed with a pair of aligned, horizontally extending, hinge pintle receiving bores 21. Pivotally connectible to the bores 21 in bracket 16 is the dipper-shaped hinge leaf 22. Hinge leaf 22 is formed from a flat strap portion 23 and a connected, U-shaped neck portion 24. The free end of the neck portion 24 is formed with a hinge pintle bore 27 that is adapted to be aligned with the hinge pintle bores 21 in bracket 16. The strap portion 23 of the hinge 22 is connectible to the lid A by the bolts 28. The portion of the hinge leaf 22 where the strap portion 23 joins the neck portion 24 is formed with a pivot pin receiving bore 25. A pivot pin 26 is adapted to be mounted in bore 25 to pivotally connect one end of a torsion bar actuating link 31 to the hinge leaf 22. The opposite end of the torsion bar actuating link 31 is formed with a transverse bore 32 to receive the offset free end 41 of the torsion bar spring element 40 that is subsequently described.

Fixedly mounted on one side wall 20 of each bracket 15 and 16 and projecting outwardly therefrom, is a torsion bar support plate 35. Each plate 35 is connected to its supporting bracket 15 or 16 by rivets or the like 36. Plate 35 is formed at its projecting end with a hook-like portion 37 that provides a substantially triangularly shaped opening 38 to receive three separate portions of the after-described torsion bar spring elements 40 and 50.

The two torsion bar spring elements 40 and 50 associated with the hinge structures H are identical in construction as clearly shown by the plan views thereof in Fig. 6. The torsion bar element 40 includes the reversely bent offset end portion 41 that is adapted to be connected to an actuating link 31. End portion 41 is connected by a U-shaped end section 42 to one end of the bar type body portion 43. The opposite end of body portion 43 is reversely bent at 44 to provide the U-shaped portion whose free end 45 is reversely bent at 47 on portion 45 to provide the offset hinge pintle end portion 46. Similar portions of torsion bar spring 50 bear reference numerals similar to those assigned spring 40.

In assembly of the torsion bar springs 40, 50 in the hinge structures H, the lid A is first positioned in the raised position shown in broken lines in Fig. 2 with the pintle receiving bores 27 in the hinge leaves 22 aligned with the hinge pintle receiving bores 21 in the side walls 20 of the brackets 15, 16. Then the elongated, rod-like body portion 43 of torsion bar spring 40 is mounted in and arranged to extend between the openings 38 of the spaced hinge bracket plates 35 after which the spring 40 is slidably moved to the left to cause the hinge pintle end 46 of spring 40 to be inserted through the pintle bores 21 in bracket 16 and pintle bore 27 in leaf 22 of the hinge structure H at the left of compartment A. This pivotally connects the hinge leaf 22 of the hinge structure H at the left side of the compartment A to the bracket 16. Next the elongated, rod-like body portion 53 of torsion bar spring 50 is mounted in and arranged to extend between the openings 38 in the spaced apart hinge brackets 35. Spring 50 has its body portion 53 resting on the body portion 43 of the spring 40. Spring 50 is then slidably moved towards the right to pass the hinge pintle end 56 of spring 50 through the hinge pintle receiving bores 21 in bracket 15 and through the aligned hinge pintle bore 27 of the leaf 22 of hinge H at the right of compartment A. This pivotally connects the hinge leaf 22 of the right hand hinge structure H to the bracket 15. Next the actuator link 31 to be associated with the end 41 of the spring 40 and the hinge structure H at the right side of compartment A has the bar end 41 inserted through the bore 32 in one end of the link 31. Thereafter the crank-like bar end 41, 42 of spring 40 is forced or twisted rearwardly about body portion 43 in a clockwise direction from a position (see Fig. 2) aligned with the bar part 47 to the position indicated by the reference numeral 52'. This twisting of the torsion bar spring during assembly places the spring in torsion so that it may operate as a counterbalance spring to hold the lid A in raised or opened position. With the crank-like spring end 41, 42 twisted to the position indicated by the numeral 52' the other end of the actuator link 31 may be pivotally connected to the hinge structure H at the right of compartment C by insertion of a pivot pin 26 through the bore 34 in link 31 and into the bore 25 in the hinge leaf 22 of the hinge structure at the right of compartment A. A similar method of assembly is applied to the offset crank-like end 51, 52 of the spring 50 to connect the end 51 of torsion bar spring 50 to the actuator link 31 associated with the hinge structure H at the left of compartment A.

Assembly of the hinge structures and deck lid may also be completed on a jig or buck and the deck lid and hinge structures subsequently fastened into body compartment C.

Mounted within the neck portion 24 of each hinge leaf 22 is a resilient bumper member 61. Bumper 61 is adapted to engage the underside of the seal supporting channel member 63 when the lid A is swung to raised or opened position. The bumper 61 thus cooperates with channel 63 to serve as a limiting device for controlling pivotal movement of the lid A in its opening direction of movement.

When the lid A is swung from opened position to closed position the actuator links 31 transmit the lid pivotal movement to the crank ends 42, 52 of the torsion bar springs 40, 50 and the end portions 42, 52 are twisted rearwardly from the dotted line position 52' of Fig. 2 to the full line position of the spring end 52 which is the position of the ends 42, 52 when the lid A is in closed position. This twisting of the springs 40, 50 on lid closing movement stresses the springs 40, 50 so that they automatically raise the lid when only a very slight amount of initial effort is applied to manually move the lid A to its opened position. As previously mentioned the lid A is held in opened position as a result of the stressing of the springs 40, 50 during assembly. Closing of the lid is also a very easy effortless operation for the weight of the lid is balanced against the force required to twist the springs 40, 50 so only a very small amount of manual effort is required to initiate closing of the lid A and consequent stressing of the springs 40, 50.

From the above description it is thought to be rather obvious that this invention provides a torsion bar type of hinge structure that is formed from a relatively few, simple, inexpensive parts that may be quickly and economically manufactured and assembled. The hinge structure occupies relatively little compartment space and is located in a portion of the compartment that has practically no use as a storage space. In addition it will be noted that the anchored ends 46 and 56 of the springs 40, 50 respectively, serve a dual function in that they provide hinge pintles for the pivotally connected brackets 15 or 16 and the hinge leaves 22 and they also provide the reaction points for the stressing of the torsion bar spring elements. Another advantage of this torsion bar hinge structure is that similar parts of the two hinge structures H are readily interchangeable.

I claim:

1. A hinge structure for a closure member adapted to swing between open and closed positions comprising a relatively fixed support, a pair of yoke-like brackets each including spaced apart side walls, said brackets being mounted on said fixed support in spaced apart relationship, hinge pintle receiving bores piercing each of the spaced apart bracket side walls, a support plate fixed to a side wall of each bracket having a portion thereof projecting outwardly from said bracket, a rod receiving formation in the outwardly projecting portion of each support plate, a pair of strap type hinge elements adapted to be fixed to the closure member in spaced apart relationship, each strap element having a portion with a hinge pintle bore therethrough aligned with and pivotally connected to one of the brackets, a pair of link members, each link member being pivotally connected to one strap element and arranged to project laterally therefrom, and a pair of elongated, rod-like torsion bar spring elements mounted in and extending between the rod receiving formations of the support plates, said spring elements each having a crank portion formed adjacent each end thereof, the crank portion at one end of each spring element being connected to a link member connected with one of the strap elements and the crank portion at the other end of each spring element being connected to the support bracket connected to the other strap element.

2. A hinge structure for a closure member adapted to swing between open and closed positions comprising a relatively fixed support, a pair of substantially yoke-like brackets including spaced apart side walls, said brackets being mounted on said fixed support in spaced apart relationship, hinge pintle receiving bores piercing each of the spaced apart bracket side walls, a support plate fixed to a side wall of each bracket having a portion thereof projecting outwardly from said bracket, a rod receiving formation in the outwardly projecting portion of each support plate, a pair of strap type hinge elements adapted to be fixed to the closure member in spaced apart relationship, each strap element having a portion with a hinge pintle bore therethrough aligned with and pivotally connected to one of the brackets, a pair of link members, each link member being pivotally connected to one strap element and arranged to project laterally therefrom, and a pair of elongated, rod-like torsion bar spring elements mounted in and extending between the rod receiving notches in the support plates, said spring elements each having a crank portion formed adjacent each end thereof, the crank portion at one end of each spring element being connected to a link member connected with one of the strap elements and the crank portion at the other end of each spring element being connected to the other strap element and arranged to provide the hinge pintle to pivotally connect the other strap element to the bracket member associated therewith.

3. A hinge construction for a pivotally mounted closure member comprising a pair of spaced bracket members each having hinge pintle bores therethrough, a pair of hinge leaves each having hinge pintle bores therethrough adapted to be aligned with and pivotally connected to the hinge pintle bores in one of said brackets, a pivot pin bore in each of said hinge leaves spaced from and substantially parallel to the hinge pintle bore therein, a support plate mounted on each bracket member having a notch formed in an edge thereof, a pair of elongated torsion bar spring elements mounted in and extending between the notches in said plates, said spring elements each having reversely bent end portions at each end thereof, one end portion of each spring element being mounted in the aligned hinge pintle bores of one bracket and associated hinge leaf and the other end portion of each spring element being adapted for pivotal connection to the other hinge leaf, and a pair of actuator links each of which is connected to one of said other end portions of each spring element with each link having a portion thereof pivotally connected to the pivot pin bore in one of said hinge leaves.

4. A hinge construction for a pivotally mounted closure member comprising a pair of spaced bracket members each having hinge pintle bores therethrough, a pair of hinge leaves each having hinge pintle bores therethrough adapted to be aligned with and pivotally connected to the hinge pintle bores in said brackets, a pivot pin bore in each of said hinge leaves spaced from and substantially parallel to the hinge pintle bore therein, a support plate mounted on each bracket member and having a notch formed in the edge thereof, a pair of elongated torsion bar spring elements mounted in and extending between the notches in said plates, said spring elements each having reversely bent end portions at each end thereof, one end portion of each spring element being mounted in the aligned hinge pintle bores of one bracket and associated hinge leaf and the other end portion of each spring element being adapted for connection to the other hinge leaf, and a pair of actuator links each of which is connected to one of said other end portions of each spring element with each link having a portion thereof pivotally connected to the pivot pin bore in one of said hinge leaves, and stop means mounted on said hinge leaves and adapted to engage a relatively fixed member to limit pivotal movement of the hinge leaves in one direction.

5. A hinge construction for a pivotally mounted closure member comprising a pair of spaced apart, relatively fixed supports each having aligned hinge pintle bores therein, a pair of hinge leaf members adapted to be mounted on said closure member each having hinge pintle bores therein adapted to be aligned with and pivotally connected to the hinge pintle bores in said supports, a rod receiving formation on each of said fixed supports and offset from the bores therein adapted to receive and support a pair of rod-like torsion spring elements, a pair of rod-like torsion spring elements mounted in and extending between said pair of formations, said spring elements each having reversely bent, offset end portions, one offset end portion of each spring element being mounted in the aligned hinge pintle bores of one support and the one associated hinge leaf to pivotally connect said one hinge leaf to the associated support and the other end portion of each spring element being connected to the other hinge leaf at a point offset from the pintle bore therein, and a pair of actuator links each of which has the opposite ends thereof pivotally connected between the said other end portion of one of said spring elements and the said point offset from the pintle bore in the other hinge leaf.

6. A hinge construction for a pivotally mounted closure member comprising a pair of relatively fixed supports each having aligned hinge pintle bores therein, a pair of hinge leaf members adapted to be mounted on said closure member each having hinge pintle bores therein adapted to be aligned with and pivotally connected to the hinge pintle bores in said supports, a rod receiving formation on each of said fixed supports adapted to receive and journal a pair of rod-like torsion spring elements, a pair of rod-like torsion spring elements mounted in and extending between said spaced rod receiving formations, said spring elements each having offset, crank-like, end portions, one end portion of each spring element being mounted in the aligned hinge pintle bores of one support and the one associated hinge leaf to pivotally connect said one hinge leaf to the associated support and the other end portion of each spring element being connected to the other hinge leaf, and a pair of actuator links each of which has spaced portions thereof pivotally connected between the said other end portion of one of said spring elements and the said other hinge leaf, the connection of each actuator link to the said other hinge leaf being axially offset from the hingle pintle bore in the said other hinge leaf.

7. A hinge structure for pivotally mounting a closure member on a relatively fixed support comprising a strap type hinge member adapted to be fixedly connected to the closure member, said hinge member having a hinge pintle portion adjacent one end thereof, a bracket mountable on said fixed support having portions pivotally connected to the pintle portion of said hinge member, a link member having one end pivotally connected to said hinge member at a point radially offset from the pivot axis of said hinge member, and a torsion bar hinge spring mounted on said bracket so as to extend substantially parallel to the pivot axis of said hinge member, one end portion of said torsion bar hinge spring being formed to be fixedly connected to said fixed support and the other end portion of said torsion bar hinge spring being connected to the other end of said link member such that pivotal movement of said hinge member about its pivot axis actuates said link member so as to twist said torsion bar hinge spring about its longitudinally extending axis.

8. A hinge structure for pivotally mounting a closure member on a relatively fixed support comprising a strap type hinge member adapted to be fixedly connected to the closure member, said hinge member having a hinge pintle portion adjacent one end thereof, a bracket mountable on said fixed support having portions pivotally connected to the pintle portion of said hinge member, a link member having one end pivotally connected to said hinge member at a point radially offset from the pivot axis of said hinge member, and a torsion bar hinge spring mounted on said bracket so as to extend substantially parallel to the pivot axis of said hinge member, each end portion of said torsion bar hinge spring being formed with an offset crank arm with one end portion of said torsion bar hinge spring being formed to be fixedly connected to said fixed support and the other end portion of said torsion bar hinge spring being connected to the other end of said link member such that pivotal movement of said hinge member about its pivot axis actuates said link member so as to twist said torsion bar hinge spring about its longitudinally extending axis.

9. A hinge structure for pivotally mounting a closure member on a fixed support comprising a pair of spaced brackets mounted on said fixed support, a pair of strap type hinge members fixed to said closure member and each having a portion thereof pivotally connected to one of said brackets for hinging movement about a substantially common axis, a pair of torsion bar hinge springs mounted on and extending between said brackets in substantially parallel relation to the hinging axis of said hinge members, one end portion of each of said torsion bars being anchored to one of said brackets, and a link member pivotally connected to each of said hinge members at a point offset from the hinging axis of the associated hinge member, each link member being connected to the other end of one of said torsion bar hinge springs such that hinging movement of said hinge members will twist said torsion bar hinge springs about their longitudinally extending axes.

References Cited in the file of this patent

UNITED STATES PATENTS

| Number | Name | Date |
|---|---|---|
| 251,591 | Jaeger | Dec. 27, 1881 |
| 641,553 | Scholder | Jan. 16, 1900 |
| 761,057 | Bommer | May 31, 1904 |
| 781,208 | Johnson | Jan. 31, 1905 |
| 808,126 | Van Wagoner et al. | Dec. 26, 1905 |
| 2,188,891 | Haltenberger | Jan. 30, 1940 |
| 2,235,984 | Devereaux | Mar. 25, 1941 |
| 2,308,759 | Joachim | Jan. 19, 1943 |
| 2,602,957 | Anderson | July 15, 1952 |

FOREIGN PATENTS

| Number | Country | Date |
|---|---|---|
| 829,162 | France | Mar. 14, 1938 |